United States Patent
Martini

(10) Patent No.: US 9,680,801 B1
(45) Date of Patent: *Jun. 13, 2017

(54) SELECTIVELY ALTERING REFERENCES WITHIN ENCRYPTED PAGES USING MAN IN THE MIDDLE

(71) Applicant: iBoss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,672

(22) Filed: May 3, 2016

(51) Int. Cl.
- G06F 15/16 (2006.01)
- H04L 29/06 (2006.01)
- H04L 29/08 (2006.01)

(52) U.S. Cl.
CPC .......... *H04L 63/0428* (2013.01); *H04L 67/02* (2013.01); *H04L 67/141* (2013.01); *H04L 67/2814* (2013.01); *H04L 67/2871* (2013.01); *H04L 67/42* (2013.01)

(58) Field of Classification Search
USPC ................ 709/227, 230, 229, 245, 246, 249
See application file for complete search history.

(56) References Cited

U.S. PATENT DOCUMENTS

| | | |
|---|---|---|
| 5,835,726 A | 11/1998 | Shwed et al. |
| 6,324,648 B1 | 11/2001 | Grantges, Jr. |
| 6,389,462 B1 | 5/2002 | Cohen |
| 6,510,464 B1 | 1/2003 | Grantges, Jr. |
| 6,594,682 B2 | 7/2003 | Peterson et al. |
| 6,742,047 B1 | 5/2004 | Tso |
| 6,938,171 B1 | 8/2005 | Isomichi et al. |
| 7,080,158 B1 | 7/2006 | Squire |
| 7,516,485 B1 | 4/2009 | Lee et al. |
| 7,606,214 B1 | 10/2009 | Sekhar et al. |
| 7,761,594 B1 | 7/2010 | Mowat |
| 7,793,342 B1 | 9/2010 | Ebrahimi et al. |
| 7,810,160 B2 | 10/2010 | Dougherty et al. |
| 7,895,256 B2 | 2/2011 | Zombek et al. |
| 7,945,779 B2 | 5/2011 | Martin |
| 8,046,495 B2 | 10/2011 | Cooper et al. |

(Continued)

FOREIGN PATENT DOCUMENTS

EP 2 528 299 A1 11/2012

OTHER PUBLICATIONS

Anonymous: "HTTP 302—Wikipedia, the free encyclopedia", , Mar. 25, 2013 (Mar. 25, 2013), pp. 1-2, XP055166412, Retrieved from the Internet: URL:http://en.wikipedia.org/w/index.php?title=HTTP 302&oldid=546866162 [retrieved on Feb. 2, 2015].

(Continued)

*Primary Examiner* — Lan-Dai T Truong
(74) *Attorney, Agent, or Firm* — Fish & Richardson P.C.

(57) ABSTRACT

A request addressed to a particular resource is received and a determination is made that the request should be redirected to a man-in-the-middle gateway within the network. A first encrypted connection is established between the client device and the man-in-the-middle gateway, and a second encrypted connection between the man-in-the-middle gateway and the server. The resource is modified into a modified resource by changing pointers within the particular resource to point to a location in a domain associated with the man-in-the-middle gateway within the network. The modified resource is served.

24 Claims, 8 Drawing Sheets

(56) References Cited

U.S. PATENT DOCUMENTS

| | | |
|---|---|---|
| 8,225,085 B2 | 7/2012 | Karandikar |
| 8,452,956 B1 | 5/2013 | Kersey et al. |
| 8,533,283 B2 | 9/2013 | Shuster |
| 8,561,181 B1 | 10/2013 | Hernacki et al. |
| 8,615,795 B2 | 12/2013 | Cottrell et al. |
| 8,739,243 B1 | 5/2014 | Martini |
| 8,782,277 B2 | 7/2014 | Kulkarni |
| 8,903,946 B1 | 12/2014 | Roskind |
| 8,949,591 B2 | 2/2015 | Ovsiannikov |
| 9,015,469 B2 | 4/2015 | Prince et al. |
| 9,021,085 B1 | 4/2015 | Jensen |
| 2001/0034791 A1 | 10/2001 | Clubb et al. |
| 2001/0055285 A1 | 12/2001 | Tomoike |
| 2002/0010798 A1 | 1/2002 | Ben-Shaul |
| 2002/0065938 A1 | 5/2002 | Jungck et al. |
| 2002/0114453 A1 | 8/2002 | Bartholet et al. |
| 2002/0178381 A1 | 11/2002 | Lee et al. |
| 2003/0093691 A1 | 5/2003 | Simon et al. |
| 2003/0105981 A1 | 6/2003 | Miller et al. |
| 2003/0131259 A1 | 7/2003 | Barton et al. |
| 2004/0015725 A1 | 1/2004 | Boneh et al. |
| 2004/0103318 A1 | 5/2004 | Miller |
| 2004/0172557 A1 | 9/2004 | Nakae et al. |
| 2004/0225895 A1 | 11/2004 | Mukherjee et al. |
| 2005/0050362 A1 | 3/2005 | Peles |
| 2005/0149726 A1 | 7/2005 | Joshi |
| 2005/0204050 A1 | 9/2005 | Turley |
| 2006/0036572 A1 | 2/2006 | Kausik |
| 2006/0056422 A1 | 3/2006 | Berkvens |
| 2006/0064750 A1 | 3/2006 | Kersey et al. |
| 2006/0136724 A1 | 6/2006 | Takeshima et al. |
| 2007/0260871 A1 | 11/2007 | Paya et al. |
| 2007/0261112 A1 | 11/2007 | Todd et al. |
| 2007/0289006 A1 | 12/2007 | Ramachandran et al. |
| 2008/0040790 A1 | 2/2008 | Kuo |
| 2008/0070573 A1 | 3/2008 | Dutta et al. |
| 2008/0082662 A1 | 4/2008 | Dandliker et al. |
| 2008/0126794 A1 | 5/2008 | Wang et al. |
| 2008/0128495 A1 | 6/2008 | Weintraub et al. |
| 2008/0163333 A1 | 7/2008 | Kasralikar |
| 2008/0215877 A1 | 9/2008 | Brabson et al. |
| 2009/0013399 A1 | 1/2009 | Cottrell et al. |
| 2009/0047947 A1 | 2/2009 | Giaretta et al. |
| 2009/0150972 A1 | 6/2009 | Moon et al. |
| 2009/0193513 A1 | 7/2009 | Agarwal et al. |
| 2009/0254990 A1 | 10/2009 | McGee |
| 2009/0262741 A1 | 10/2009 | Jungck |
| 2009/0296657 A1 | 12/2009 | Omar et al. |
| 2009/0313318 A1 | 12/2009 | Dye |
| 2010/0138910 A1 | 6/2010 | Aldor et al. |
| 2010/0146260 A1 | 6/2010 | Levow et al. |
| 2010/0218248 A1 | 8/2010 | Nice et al. |
| 2010/0242092 A1 | 9/2010 | Harris |
| 2010/0250754 A1 | 9/2010 | Birch et al. |
| 2010/0313016 A1 | 12/2010 | Zhang et al. |
| 2011/0083154 A1 | 4/2011 | Boersma |
| 2011/0154443 A1 | 6/2011 | Thakur |
| 2011/0208838 A1 | 8/2011 | Thomas et al. |
| 2011/0231929 A1 | 9/2011 | Rao et al. |
| 2011/0282997 A1 | 11/2011 | Prince |
| 2012/0124372 A1 | 5/2012 | Dilley et al. |
| 2012/0174196 A1 | 7/2012 | Bhogavilli |
| 2012/0290829 A1 | 11/2012 | Altman |
| 2012/0324113 A1 | 12/2012 | Prince |
| 2013/0094356 A1 | 4/2013 | Keith et al. |
| 2013/0117400 A1 | 5/2013 | An et al. |
| 2013/0311677 A1 | 11/2013 | Coulson |
| 2014/0007222 A1 | 1/2014 | Qureshi |
| 2014/0123266 A1 | 5/2014 | Carbou |
| 2014/0143852 A1 | 5/2014 | Cottrell et al. |
| 2014/0143855 A1 | 5/2014 | Keoh et al. |
| 2014/0164447 A1 | 6/2014 | Tarafdar |
| 2014/0173729 A1 | 6/2014 | Cappos et al. |
| 2014/0201809 A1 | 7/2014 | Choyi et al. |
| 2015/0039674 A1 | 2/2015 | Agarwal |
| 2015/0039756 A1 | 2/2015 | Agarwal |
| 2015/0319191 A1 | 11/2015 | Georgiev |

OTHER PUBLICATIONS

Anonymous: "Java Practices—Forward versus redirect", , Dec. 27, 2012 (Dec. 27, 2012), pp. 1- 2, XP055166404, Retrieved from the Internet: URL:http://web.archive.org/web/20121227015318/http://www.javapractices.com/topic/TopicAction.do?Id=181 [retrieved on Feb. 2, 2015].

Acharya et al., "MPLS-based Request Routing", Jun. 10, 2001. Downloaded from the internet at: http://www.inf.fu-berlin.de/lehre/SS03/19531-V/lecture9.pdf, on Apr. 4, 2013, 9 pages.

Big-IP, "Big-IP® Solutions Guide, Version 4.2", 2002, downloaded from the internet at http://support.f5.com/content/kb/en-us/archived_products/big-ip/manuals/product/bag42/_jcr_content/pdfAttach/download/file.res/BIG-IP_Controller_Solutions_Guide%2c_version_4.2.pdf on Apr. 4, 2013, 214 pages.

Blue Coat White Paper (How to Gain Visibility and Control of Encrypted SSL Web Sesstions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.

Burkholder, "SSL Man-in-the-Middle Attacks," *Reading Room SANS*, 2002, downloaded from the internet at: http://www.sans.org/reading_room/whitepapers/threats/ssl-man-in-the-middle-attacks_480, on May 16, 2013, 17 pages.

Faruque, "Open Source Open Standard", Sep. 28, 2012, downloaded from the internet at: http://tektab.com/2012/09/28/squid-transparent-proxy-for-https-ssl-traffic/ on Apr. 26, 2013 5 pages.

Glype.com, "Glype Proxy Script", May 2, 2013, downloaded from the internet at http://www.glype.com/ on May 2, 2013, 2 pages.

Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opendns-for-content-filtering-visited-sites-log-etc on May 3, 2013 7 pages.

Murdoch, et al. "Tools and Technology of Internet Filtering," Dec. 2011, http://oni-access.net/wp-content/uploads/2011/12/accessdenied-chapter-3.pdf, on May 16, 2013, 16 pages.

Nayak et al. "Different Flavours of Man-In-The-Middle Attack, Consequences and Feasible Solutions", 3rd IEEE International Conference on Computer Science and Information Technology (ICCSIT), Jul. 9-10, 2010, pp. 491-495.

Portswigger, Ltd. "Burp Proxy Options", Apr. 26, 2013, downloaded from the internet at: http://portswigger.net/burp/help/proxy_options.html#listemers_cert on Apr. 26, 2013, 4 pages.

Portswigger, Ltd. "Getting Started with Burp Suite", Apr. 26, 2013, downloaded from the internet at: http://portswigger.et/burp/help/suite_gettingstarted.html, on Apr. 26, 2013, 4 pages.

Proxy.appspot.com, "My Proxy Server", Apr. 26, 2013, downloaded from the internet at: http://mvy-proxy.appspot.com on Apr. 26, 2013, 1 page.

Rousskov , "Feature: Squid-in-the-middle SSL Bump," Apr. 20, 2012, downloaded from the internet at: http://wiki.squid-cache.org/Features/SslBump on Apr. 26, 2013, 2 pages.

Ryan, "URL vs URI vs URN: The Confustion Continues", Jan. 18, 2011, downloaded from the internet at: http://damnhandy.com/2011/01/18/url-vs-uri-vs-urn-the-confustion-continues/ on Dec. 10, 2013, 7 pages.

Security Stack Exchange, "How do I check that I have a direct SSL connection to a website?" May 7, 2012, downloaded from the internet at: http://security.stackexchange.com/questions/14676/how-do-i-check-that-i-have-a-direct-ssl-connection-to-a-website on Apr. 26, 2013, 2 pages.

vonRandow, "SSL Proxying", Apr. 26, 2013, downloaded from the internet at: http://www.charlesproxy.com/documentation/proxying/ssl-proxying/ on Apr. 26, 2013, 2 pages.

Websense, Inc., "DNS Proxy Caching", 2011, downloaded from the internet at http://www.websense.com/content/support/library/web/v76/wcg_help/dns_proxy_caching.aspx on Apr. 4, 2013, 2 pages.

(56) References Cited

OTHER PUBLICATIONS

Wikipedia, "Proxy server", Apr. 21, 2013, downloaded from the internet at: http://en.wikipedia.org/w/index.php?title<Proxy_server&oldid=551454120 on Oct. 31, 2014, 12 pages.

International Search Report and Written Opinion issued in International Application No. PCT/US2014/034236, mailed Jul. 24, 2014, 11 pages.

International Search Report and Written Opinion issued in International Application No. PCT/US2014/037009, mailed Nov. 11, 2014, 10 pages.

International Search Report and Written Opinion issued in International Application No. PCT/US2014/039231, mailed Feb. 11, 2015, 12 pages.

International Preliminary Report on Patentability issued in International Application No. PCT/US2014/039231, issued Nov. 24, 2015, 8 pages.

International Preliminary Report on Patentability issued in International Application No. PCT/US14/51154, mailed Feb. 25, 2016, 10 pages.

SELECTIVELY ALTERING REFERENCES WITHIN ENCRYPTED PAGES USING MAN IN THE MIDDLE

TECHNICAL FIELD

The present document relates to computer networking.

BACKGROUND

A computer network is a collection of computers and other hardware interconnected by communication channels that allow sharing of resources and information. Communication protocols define the rules and data formats for exchanging information in a computer network. A gateway on a network is a node on the network equipped for interfacing with another network or networks. The gateway is often used for passing data between devices on different networks. Transport Layer Security (TLS) and Secure Socket Layer (SSL) are two examples of cryptographic communication protocols that provide communication security by allowing devices to exchange encrypted, as opposed to plaintext, messages.

SUMMARY

In one aspect, a method is performed by data processing apparatus. The method includes receiving, from a client device within a network, a request addressed to a particular resource on a server outside the network. The method further includes determining that the request should be redirected to a man-in-the-middle gateway within the network. The method further includes redirecting the request to a man-in-the-middle gateway within the network responsive to determining that the request should be redirected. The method further includes establishing a first encrypted connection between the client device and the man-in-the-middle gateway, and a second encrypted connection between the man-in-the-middle gateway and the server. The method further includes retrieving, by the man-in-the-middle-gateway, the particular resource from the server. The method further includes modifying the particular resource into a modified resource by changing pointers within the particular resource to point to a location in a domain associated with the man-in-the-middle gateway within the network. The method further includes serving, by the man-in-the-middle-gateway to the client device, the modified resource.

Implementations can include any, all, or none of the following features. The request is a first request and the client device is a first client device, the method further comprising: receiving, from a second client device within the network, a second request addressed to the particular resource; determining that the second request should not be redirected to the man-in-the-middle gateway within the network; responsive to determining that the second request should not be redirected to the man-in-the-middle gateway, redirecting the second request to a proxy service outside of the network configured to: establish a third encrypted connection between the second client device and the proxy service, and a fourth encrypted connection between the proxy service and the server; retrieve the particular resource from the server; modify the particular resource into a second modified resource by changing pointers within the particular resource; and serve the second modified resource to the second client device. Receiving, from a third client device within the network, a third request addressed to an address of a second resource on a second server outside the network; and routing the request to the address of the second resource. Modifying the particular resource into the modified resource comprises modifying the particular resource based on a security policy. Modifying the particular resource comprises replacing the resource with a different resource. Modifying the particular resource comprises replacing Hypertext Transfer Protocol (HTTP) links in the particular resource with different HTTP links. Modifying the particular resource comprises replacing the resource with an HTTP status code object. Determining that a security policy of the network identifies the particular resource for inspection upon entry to the network.

In one aspect, a system includes a processor configured to execute computer program instructions; and a tangible, non-transitory computer storage medium encoded with computer program instructions that, when executed by the processor, cause the system to perform operations. The operations include receiving, from a client device within a network, a request addressed to a particular resource on a server outside the network. The operations include determining that the request should be redirected to a man-in-the-middle gateway within the network. The operations include redirecting the request to a man-in-the-middle gateway within the network responsive to determining that the request should be redirected. The operations include establishing a first encrypted connection between the client device and the man-in-the-middle gateway, and a second encrypted connection between the man-in-the-middle gateway and the server. The operations include retrieving, by the man-in-the-middle-gateway, the particular resource from the server. The operations include modifying the particular resource into a modified resource by changing pointers within the particular resource to point to a location in a domain associated with the man-in-the-middle gateway within the network. The operations include serving, by the man-in-the-middle-gateway to the client device, the modified resource.

In one aspect, a non-transitory, computer-readable medium storing instructions operable when executed to cause at least one processor to perform operations. The operations include receiving, from a client device within a network, a request addressed to a particular resource on a server outside the network. The operations include determining that the request should be redirected to a man-in-the-middle gateway within the network. The operations include redirecting the request to a man-in-the-middle gateway within the network responsive to determining that the request should be redirected. The operations include establishing a first encrypted connection between the client device and the man-in-the-middle gateway, and a second encrypted connection between the man-in-the-middle gateway and the server. The operations include retrieving, by the man-in-the-middle-gateway, the particular resource from the server. The operations include modifying the particular resource into a modified resource by changing pointers within the particular resource to point to a location in a domain associated with the man-in-the-middle gateway within the network. The operations include serving, by the man-in-the-middle-gateway to the client device, the modified resource.

The systems and processes described here may be used to provide a number of potential advantages. A gateway can decouple domains from shared Internet Protocol (IP) addresses and selectively choose to intercept encrypted (e.g., SSL, TLS, etc.) requests. Further, if spoofed IP addresses are redirected to another server on the network, performance issues may be alleviated as only selected requests are sent to man in the middle (MitM) gateways for decryption. Encrypted traffic can also be inspected at network egress and ingress, allowing a network administrator to enforce security policies consistently across both cryptographically protected traffic and plaintext traffic. Because the approach described herein uses standard communication protocols, client devices (e.g. cell phones, tablets, laptops) can join the network and be subject to monitoring using the present techniques with little or no special configuration. Finally, by supporting either local (e.g., on a network) or cloud based (e.g., accessible via the Internet) DNS and man-in-the-middle services, a variety of configuration options are possible for network administers to select based on the needs of a particular network. Additional DNS and man-in-the-middle services may be added and removed, for example, in response to changing loads on the network.

The techniques described herein may also allow a browser to display resources from untrusted domains in a trusted manner because of the trust relationship between the browser and the MitM gateway. Because the resources appear to the browser to originate from the MitM gateway, it will display the resources in a trusted context.

DESCRIPTION OF DRAWINGS

Like reference symbols in the various drawings indicate like elements

DETAILED DESCRIPTION

When data on a network is encrypted (e.g., by SSL or TSL) it can be difficult to inspect the data as it is transferred between the end users and servers on the Internet. This inability to inspect the encrypted data can lead to malicious programs (e.g., viruses) being transferred over secure connections and entering the network instead of being blocked by security appliances in the network.

The present document describes techniques for selectively applying man in the middle decryption to network data based on rules indicating which destinations should be decrypted. A network gateway maps specific IP addresses to correlated domain in order to, among other uses, determine which encrypted connections should by bypassed and sent directly to the Internet destination and which connections should be decrypted using a man in the middle technique.

Computer networks generally have one or more gateways that allow communication between devices on the network and devices on other networks (e.g. the Internet). One such gateway can be a network gateway 102 that routes plaintext (i.e., non-encrypted) traffic among devices within the network and devices outside of the network. One common type of plaintext traffic that is routed through a network gateway 102 is a request message (e.g., Hypertext Transfer Protocol's GET and POST, Post Office Protocol's RETR), which is a request to a server for a resource on the server.

Instead of passing all request messages to the server, the network gateway 102 or another appliance can intercept some of the request messages if the network gateway 102 determines that traffic between the network devices and the URLs or URIs will be encrypted. For these request messages, the network gateway 102 can respond to the network device with the address or addresses of one or more man in the middle (MitM) gateways in the network. The MitM gateways may then act as man in the middle proxies for the resource at the URL or URI, allowing cryptographically secure communication that can be inspected when entering or exiting the network.

In such a configuration, as described in greater detail below, the browser communicates requests for resources to the MitM gateway, which in turn retrieves the resources on behalf of the browser. One issue with such a configuration is that the retrieved resources may contain links or other references to linked resources hosted by servers on the domain that provided the resource or to servers on other domains. In such a case, the MitM gateway may modify the URLs in these links or references to point to itself, so that when the browser retrieves the linked resources, the requests will be sent to the MitM gateway. The MitM gateway can then process these requests in a similar manner to the original request for the resource, and retrieve and provide the linked resources to the browser.

Figure 1A:
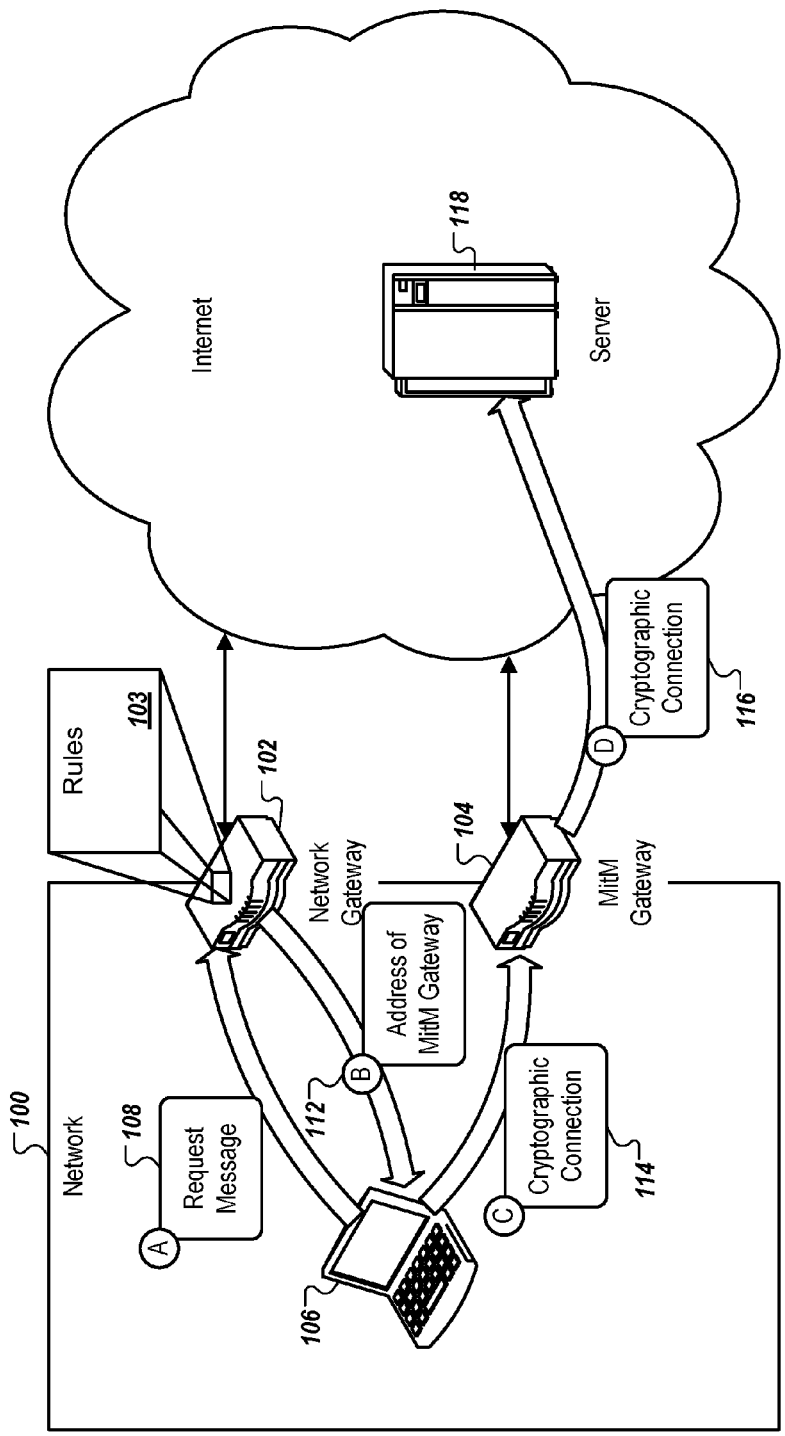
FIG. 1A is a block diagram of a network with a network gateway and a man in the middle gateway.

FIG. 1A is a block diagram of a network 100 with a network gateway 102 and a MitM gateway 104. The network 100 includes a client device 106, which is a computing device capable of browsing resources outside of the network 100. The network 100 can also include other elements including, but not limited to, wireless and/or wired access points, file and/or application servers, routers, and network cables, as well as additional client devices 106, network gateways 102, and/or MitM gateways 104.

The network 100 can be configured to route some or all of the plaintext messages addressed outside the network 100 to the network gateway 102. The network gateway 102 can inspect the plaintext messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly. In some cases, other network appliances may be placed in line with the network gateway 102 (e.g, between the client device and the network gateway 102 in the network 100) and this other network appliance may intercept traffic from the client device before it reaches the network gateway 102.

For example, the network gateway 102 may intercept and examine a request message 108 from the client device that is addressed to a server 118. Based on, for example, the URL or URI in the request message and rules 103 indicating which destination should be decrypted and which should be passed directly to the Internet destination, the network gateway 102 may determine that, instead of passing the request message to the server 118, the network gateway 102 should respond to the request message with a MitM gateway address 112 in, for example, a redirect message to the client device 106. The network gateway 102 may be configured to make this determination so that encrypted communication from the client device first passes through the MitM gateway 104, thereby allowing the gateway 104 to decrypt the communication and perform man in the middle data inspection before allowing the communication to pass out of the network 100. The network gateway 102 may make the determining to pass encrypted communication through the MitM gateway 104 based on security policies or concerns as applied to the network 100. While passing communication through the MitM gateway 104 may provide some other benefits (e.g., caching of frequently visited resources to reduce bandwidth usages), the rules may be configured to primarily or exclusively account for the security considerations of passing communications through the network gateway 102 or the MitM gateway 104.

The client device, upon receiving the MitM gateway 104 address, can initialize a cryptographic connection 114 with the MitM gateway 104 at the MitM gateway address. The cryptographic connection may be an SSL, TLS, or any other appropriate cryptographic session. The MitM gateway 104 may then initialize another cryptographic connection 116 with the server 118 that hosts the resource identified by the URL or URI of the DNS request.

Once the cryptographic connections and are established, the client device and the server 118 may communicate with each other. In this communication, the MitM gateway 104 may act as a proxy of the server 118 for the client device and as a proxy of the client device for the server 118. The MitM gateway 104 is thus able to receive an encrypted message from the client device, decrypt the message, inspect the message, optionally alter or drop the message, encrypt the possibly altered message into a second encrypted form, and pass the message to the server 118. The MitM gateway 104 may perform the same type of reception, decryption, inspection, alteration or drop, encryption, and passage with messages from the server 118 to the client device. The MitM gateway 104 may sometimes be referred to by other terms including, but not limited to, a reverse proxy, intercepting proxy, accelerator, accelerating proxy, and transparent proxy.

One type of alteration that may be made by the MitM gateway 104 is to alter the URLs and URIs of webpages served by the server 118. For example, the server 118 may serve a webpage with a number of links to other webpages on the same website. The MitM gateway 104 may replace those URLs and URIs that are similar to the original URLs and URIs but which point to the MitM gateway 104.

In one example, the server 118 may serve a webpage with the URL "www.exampleEncryptedPage.com", and this webpage may have links to "www.exampleEncryptedPage.com/media.html" and "www.exampleEncryptedPage.come/links.html." The MitM gateway 104 may replace those links with "www.MitMGateway.com/page.php?url=www.exampleEncryptedPage.com/media.html" and "www.MitMGateway.com/page.php?url=www.exampleEncryptedPage.com/links.html," respectively. In this example, the URL "www.MitMGateway.com" can be configured to resolve to an IP address of the MitM gateway 104. The modified URL may be encoded according to any scheme that allows the MitM gateway to identify and retrieve the original URL.

The inspection, alteration, and dropping performed by the MitM gateway 104 can allow the MitM gateway 104 to ensure that encrypted communication into and out of the network conforms to any number of policies. For example, the network may have a policy of inspecting incoming messages for computer viruses, malware, or other unwanted content. The network gateway 102, handling plaintext messages, can inspect the payloads of the messages and drop any messages that match viral signatures, malware black-lists, etc. The MitM gateway 104 may apply the same policy, inspecting incoming messages in their decrypted state and drop any messages that fail the same tests as applied by the network gateway 102.

In some examples, the request message may be transmitted as plaintext the clear. That is, the request message may be in a cleartext form conforming to the HTTP specification. The address of the MitM gateway 104 may specify a secure connection. That is, the address of the MitM gateway 104 may specify that the client device 106 should connect by HTTP Secure ("HTTPS"). This may be beneficial, for example, for ensuring that all content requested and served from the server 118 is encrypted, even if the server 118 does not enforce an encrypted-only policy.

Figure 1B:
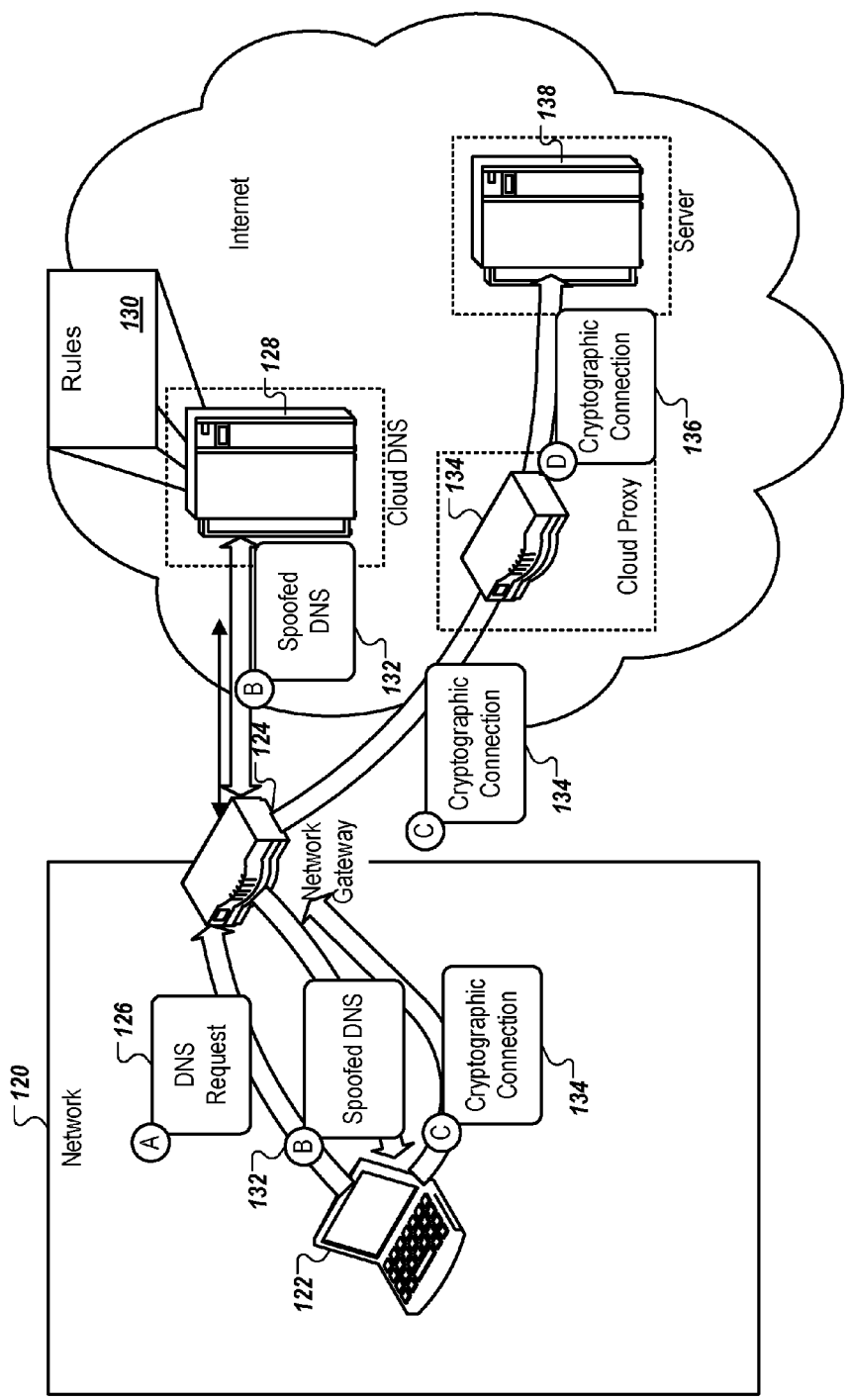
FIG. 1B is a block diagram of a network that uses cloud services for DNS and man in the middle services.

FIG. 1B is a block diagram of a network that uses cloud services for DNS and man in the middle services. By way of contrast with the network 100, the communications from clients (e.g., client 122) on the network 120 are serviced by DNS services and man in the middle services that are located outside of the network 120.

For example, the network gateway 124 may receive a DNS request 126 from the client device and route the DNS request to a cloud DNS service 128. The cloud DNS service (as well as a cloud proxy and a server) is shown surrounded by a dotted line to indicate that it is hosed on a network connected to the internet, and that this network is different than the network 120. By way of comparison, the network gateway 102 that performs some or all DNS services for the network 100 is hosed on the network 100.

Based on a set of rules 130, the DNS service may decide to either return an accurate DSN response containing the IP address of the resource identified in the DNS request, or the DNS service may respond with a spoofed reply 132 that identifies the IP address of a proxy service 134 (e.g., a cloud based proxy service). In this example, the spoofed DNS response identifies the IP address of the proxy service.

The client device can receive the spoofed DNS response and initiate a cryptographic connection 134 with the proxy service. Once this connection is made, the cloud proxy can create another cryptographic connection 136 with a server 138 that hosts the resource originally requested in the DNS request.

Figure 1C:
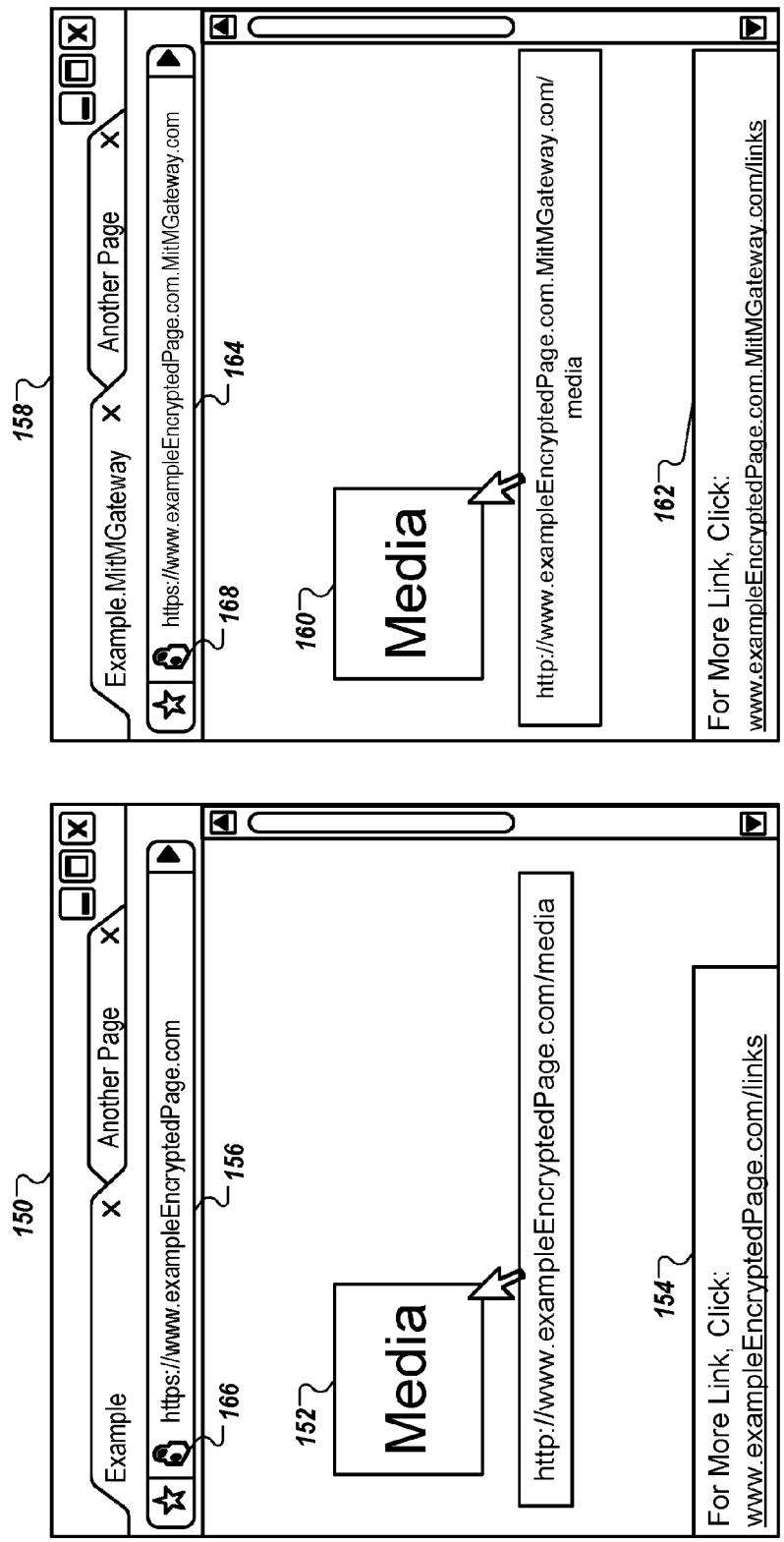
FIG. 1C is a diagram of a webpage that has been modified.

FIG. 1C is a diagram of a webpage that has been modified. For clarity of description, here and elsewhere, variable names are enclosed in square brackets. Original webpage 150 is a rendered webpage that may be served by, for example, the server 118. The original webpage 150 can include pointers to other webpages such an image 152 with an embedded link, and a text link 154. The original webpage is located at the URL 156 http://www.exampleEncryptedPage.com.

Modified webpage 158 is a rendered webpage that has been created by modifying the original webpage. For example, the MitM gateway 104 may receive the original webpage from the server 118 and modify the original webpage to create the modified webpage.

The modified webpage 158 contains an image 160 that corresponds to the image 152 and a text link 162 that corresponds to the text link 154. However, the embedded link of image 160 and the text link 162 have been modified to address of a domain associated with the MitM gateway 104. Similarly, the URL 164 of the webpage 158 has been modified from the URL 156. With these substitutions, the webpage 158 may be rendered to include links to the "MitMGateway" domain instead of the "exampleEncryptedPage" domain. In some cases, in addition to updating the anchor property link, the text of the text link 162 may be updated to indicate the "MitMGateway." In some cases, the text of the link 162 may be unmodified while the anchor property link may be updated to point to the "MitMGateway."

In this example, the browser displays a lock icon 166 and 168 with the original webpage and the modified webpage. A web browser may be configured, for example, to display lock icons 166 and 168 when a webpage with trusted encryption is being rendered. In the case of the original webpage 150, the encrypted connection can be considered trusted if an encrypted connection to the server is trusted. In the case of the modified webpage, the encrypted connection can be considered trusted if an encrypted connection to the MitM gateway 104 is trusted. For example, the administrator of the device rendering the modified webpage may also be the administrator of the MitMGateway.com domain. As such, the administrator may install a certificate in the machine to trust the MitMGateway.com domain. In such a configuration, the browser may indicate to the user that the server from which the page is being retrieved is trusted, as opposed to displaying a warning message or graphical indication that the server is untrusted as it would if the resource we retrieved directly from the exampleEncryptedPage domain, with which no such trust relationship exists.

As shown here, URLs and URIs are replaced in the modified webpage by inserting "[MitMGatway]." before the top level domain portion of URLs and URIs in the original webpage. However, other forms of address modification are possible.

For example, elements of addresses in the original webpage may be used as parameters in addresses in the modified webpage. In this example, the image may have an embedded link to "www.MitMDomain.com/page.php?origurl=www.exampleEncryptedPage.com/media", and the text link 162 may be to "www.MitMDomain.com/page.php?origurl=www.exampleEncryptedPage.com/links".

Figure 2:
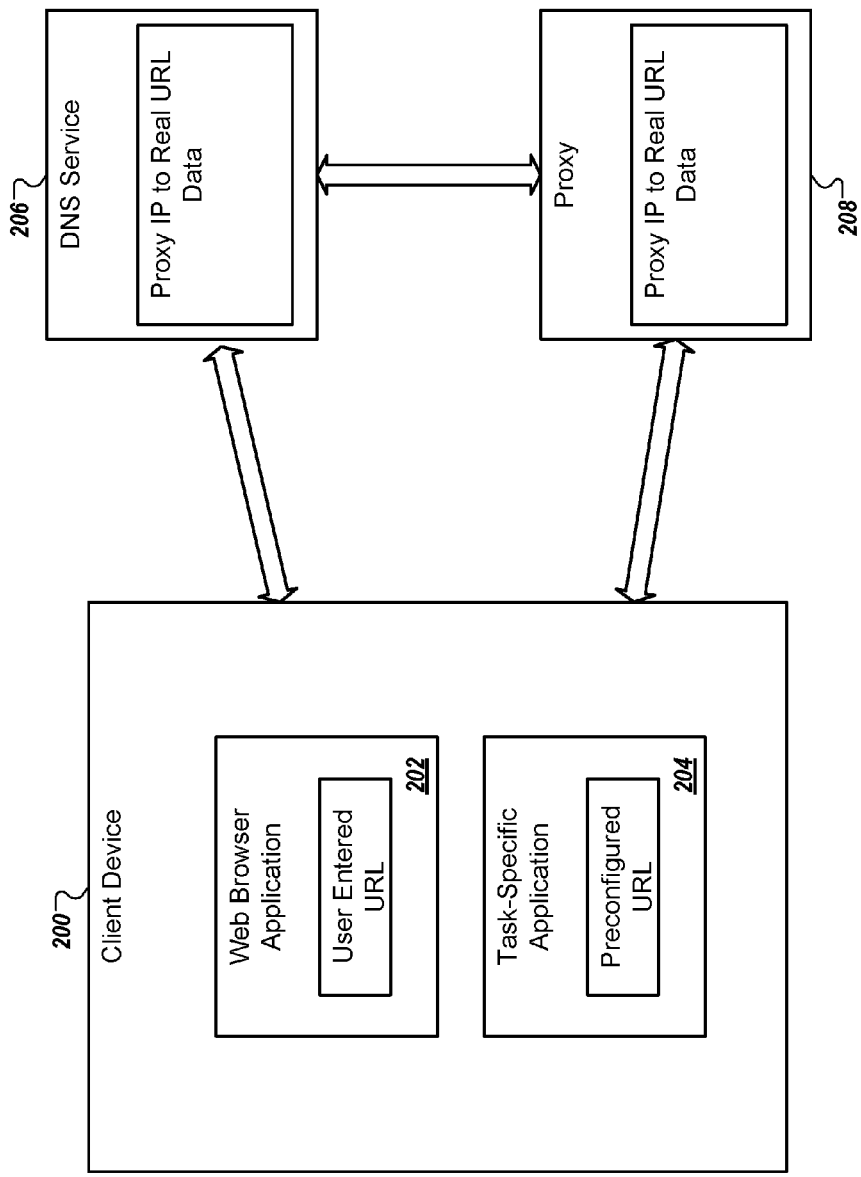
FIG. 2 is a block diagram of a client having multiple network-connected applications.

FIG. 2 is a block diagram of a client device 200 having multiple network-connected applications. For example, the client device may have installed a web browser application 202 and a task-specific application 204. The task-specific application could represents any appropriate application that communicates with one or more services that are available over the internet. Examples include, but are not limited to, a document editor that synchronizes with an online document repository, a video game that communicates with a central server, or an email client. Although only one web browser application task-specific application is shown installed on the client device, it will be understood that more and different applications of the same or different types may be installed.

The client device 200 may be hosted on any appropriate computer network, including the networks 100 and 120. To establish communication channels with remote resource, the client device may send DNS requests to a DNS service 206 which, as has been previously described, response with correct or spoofed DNS responses with IP addresses that resolve to a proxy 208. To generate a spoofed DSN response, the DNS service may maintain mapping of proxy IP addresses to URLs. Similarly, the proxy may maintain the same data (e.g., either looking up the data in the DNS service or from the same location used by the DNS service, or keeping a separate copy).

The proxy may have more than one IP address associated with it, and these multiple IP addresses may be maintained in the IP to URL data. For example, consider a cloud application that can be used for editing image files, document files, and general file storage. The login for this service may be login.example.com, with the different portions of the application available at photo.example.com, documents.example.com, and storage.example.com. To use this service, a user may use the web browser application to navigate to login.example.com, then navigate to photo.example.com, documents.example.com, and storage.example.com. In this case, the IP to URL mapping data may have spoofed IP addresses for login.example.com, documents.example.com, and storage.example.com. In this case, image editing has been decided to not pose a threat needing man in the middle analysis.

When the web browser application generates a DSN request for, for example, login.example.com, the DNS service can respond with the IP address associated with login.example.com in the IP to URL mapping data. The web browser application can then begin a communication session (e.g., a TLS encrypted HTTPS session) with the IP address it received, that is, with the proxy. When the proxy receives this request, to determine which URL the web browser application was attempting to connect with, the proxy can look up the URL associated with the IP in the IP to URL mapping data. Since multiple IP addresses as associated with the proxy, the IP address may be used as an identifier for a particular URL.

Unlike the web browser application, a network administrator may not wish for traffic from the task-specific application to pass through the proxy. For example, many application do not permit new certificates to be installed and communicating with an untrusted proxy may not be permitted by the application. In this case, the task-specific application is a photo editing application that communicates with photos.example.com. As the DNS service does not have a spoofed IP address for the photos.example.com URL, the DNS service can provide the task-specific application with the true IP address of photos.example.com. In some cases, a list of domains or URLs known to be used by task-specific application may be maintained by the DNS service. In these cases, before looking up a URL in the IP to URL mapping data, the DNS service may use the list of domains or URLs used by task-specific applications as a white-list. If a DNS request is received, it is first compared to the white-list. If a match is found, the response may be not spoofed, thus ensuring that task-specific application functionality is preserved. In other cases, this white-list may not be used, for example, when security concerns are considered more important than availability of task-specific application functionality.

Figure 3:
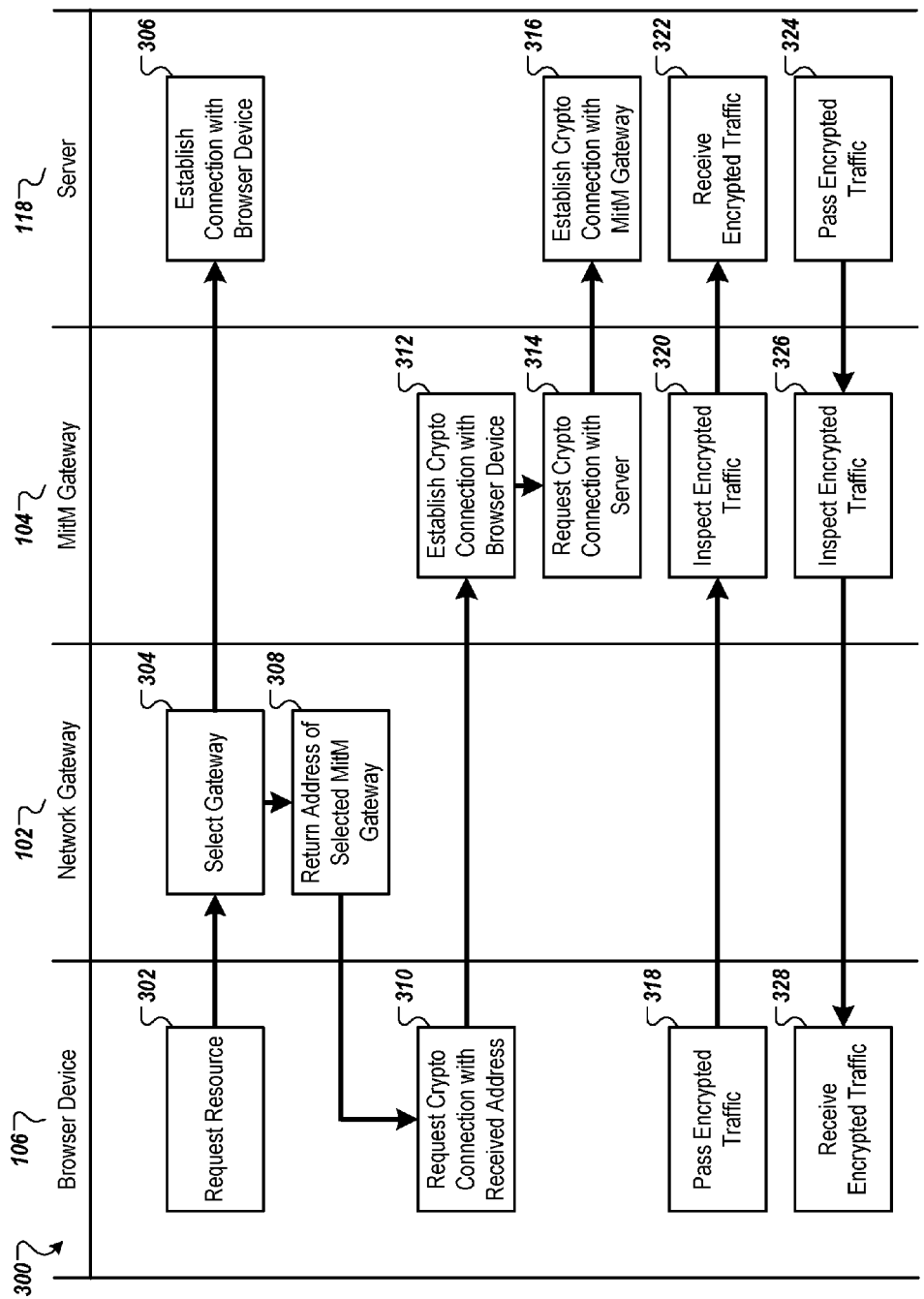
FIG. 3 is a swim-lane diagram of an example process for establishing a communication link through a man in the middle gateway.

FIG. 3 is a swim-lane diagram of an example process 300 for establishing a communication link through a MitM gateway. The process 300 is described with reference to the components shown in FIG. 1A. However, other components, including and not limited to the components shown in FIG. 1B and FIG. 4, can be used to perform the process 300 or a similar process.

The client device creates a request message for a resource (302). For example, a user may request to download, from a hosted storage system, a data object identified by a unique URI. The client device can create a request message that includes the data object's URI and send the request message to the network gateway 102.

The network gateway receives the request and selects a gateway to be used for traffic associated with the website address (304). For example, the network gateway 102 can process a set of rules that indicate which destination should be decrypted and which should be passed directly to the Internet destination. These rules may include, for example, a list of URLs, URIs, domain names and IP address mapped to security policies, content classifications, or directions for handling of network traffic (e.g., specifying that the traffic should be decrypted and inspected). If the network gateway selects the network gateway for the traffic to pass directly to the Internet destination, the client device and the server establish a connection through the network gateway (306). For example, if the network gateway 102 determines that the client device is likely to start an unencrypted communication session with the hosted storage system, the network gateway 102 can pass the request message to the server 118 (see FIG. 1A) and permit the client device to create an unencrypted connection with the server 118.

If the network gateway selects the MitM gateway, the network gateway returns the address of the selected MitM gateway (308). For example, the network gateway 102 may have a record of past connections with the hosted storage system and determine that the hosted storage system usually communicates through encrypted communication channels. In such a case, the network gateway 102 may select the MitM gateway 104 for the communication between the client device and the server 118 and thus may return a redirect to the network address of the MitM gateway 104 to the client device 106. Many types of redirection are possible, including but not limited to server-side scripting, frame redirects, and Apache mod_rewrite. Regardless of the redirection used, the redirection can include sufficient information for the MitM gateway 104 to identify the originally requested content.

The client device requests an encrypted connection with the device at the received address, which is the MitM gateway (310). For example, the client device may send to the MitM gateway 104 an SSL Hello or other encryption handshake message. In another example, the MitM gateway 104 may have multiple network addresses, each associated with known destination URLs. When a connection request is received at one of the multiple addresses, the MitM gateway may look up the associated URL. The client device and the MitM gateway establish a first encrypted connection (312). For example, the MitM gateway 104 may act as a proxy of the server 118, mimicking the interface of the server 118 in communications with the client device.

The MitM gateway requests an encrypted connection with the server (314). For example, the MitM gateway 104 can request an encrypted connection on behalf of the client device. The MitM gateway and the server establish a second encrypted connection (316). For example, the MitM gateway 104 may act as a proxy of the client device, mimicking the interface of the client device in communications with the server 118. The two encryption sessions may be of the same or different formats or types.

The client device generates traffic, encrypts the traffic into a first encrypted form, and passes the traffic to the MitM gateway (318). For example, the client device can create a HTTP Get request for the data object. The client device can encrypt the HTTP Get request according to the requirements of the encrypted connection with the MitM gateway 104 and pass the encrypted HTTP Get request to the MitM gateway 104.

The MitM gateway receives the traffic, decrypts the traffic, inspects the traffic, encrypts the traffic into a second encrypted form, and passes the traffic to the server (320). For example, the MitM gateway 104 can decrypt the encrypted message into plaintext and determine that the message is an HTTP Get request. The MitM gateway 104 can compare the HTTP Get request with the rules of any policies that apply to traffic out of the network. If the HTTP Get request does not violate any policy, the MitM gateway 104 can encrypt the HTTP Get request according to the requirements of the encrypted connection with the server 118 and pass the encrypted HTTP Get request to the server 118. If the HTTP Get request does violate a policy, the MitM gateway 104 can modify or drop the request, as specified by the policy.

The server receives the traffic in the second encrypted form (322). For example, the server 118 may receive the encrypted HTTP Get request, decrypt the HTTP Get request, and determine that the user of the client device 106 has authorization to access the requested data object.

The server generates traffic, encrypts the traffic into a third encrypted form, and passes the traffic to the MitM gateway (324). For example, the server 118 can access the requested data object, format the data object into HTML or other appropriate format, and add the HTML object to an HTTP reply. The server 118 can encrypt the HTTP reply according to the requirements of the encrypted connection with the MitM gateway 104 and pass the encrypted HTTP reply to the MitM gateway 104

The MitM gateway receives the traffic, decrypts the traffic, inspects the traffic, encrypts the traffic into a fourth form, and passes the traffic to the client device (326). For example, the MitM gateway 104 can decrypt the encrypted message into plaintext and determine that the message is an HTTP reply. The MitM gateway 104 can compare the HTTP reply with the rules of any policies that apply to traffic into the network. If the HTTP reply does not violate any policy, the MitM gateway 104 can modify the HTML object to replace addresses of the server 118 with address of the MitM gateway 104, encrypt the HTTP reply according to the requirements of the encrypted connection with the client device and pass the encrypted HTTP reply to the client device. If the HTTP reply does violate a policy (e.g., contains malicious code, too large), the MitM gateway 104 can modify or drop the reply, as specified by the policy.

The client device receives the encrypted traffic (328). For example the client device can decrypt the HTTP reply, extract the modified HTML object, and render the modified HTML object in a web browser.

Although a particular number, type, and order of operations are shown here, other numbers, types, and orders of operations are possible. For example, if there are multiple MitM gateways available, the network gateway 102 may select one or more and return the addresses of selected MitM gateways. In another example, the client device and the server 118 may create and pass encrypted traffic in the opposite order shown here or substantially at the same time.

Figure 4:
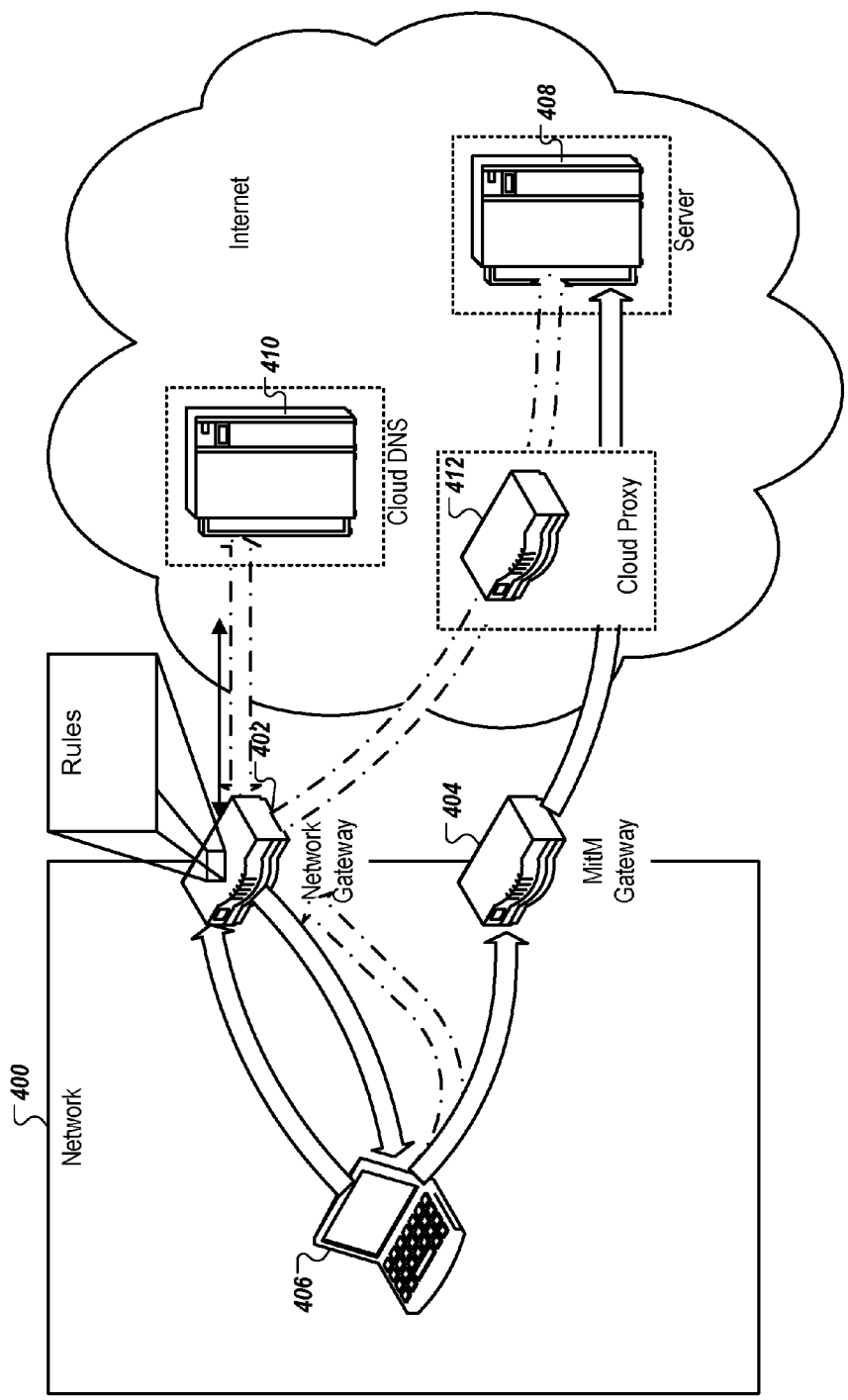
FIG. 4 is a block diagram of a network adding cloud services for DNS and/or man in the middle services.

FIG. 4 is a block diagram of a network adding cloud services for DNS and/or man in the middle services. In this example, a network 400 uses a network gateway 402 and man in the middle gateway 404 to provide man in the middle services to the client device 406, and any other client devices not shown. The network 400 may, in times of normal network load, operate the same as or similar to the network 100 as describe with respect to FIG. 1.

However, when the traffic on the network 400 increases to levels that the network gateway 402, man in the middle gateway, or other resources may not be able to reliably handle, the network may supplement the network gateway 402 and/or man in the middle gateway with cloud services. For example, if the man in the middle gateway is unable to decrypt all of the traffic routed through it for inspection (as determined by the network gateway 402, the man in the middle gateway, or another element of the network), the network gateway 402 may begin directing some of the new requests to a cloud proxy 412. Additionally or alternatively, man in the middle gateway may close some of the connections it is maintaining and redirect the client device to restart the connection with the cloud proxy.

Similarly, if the network gateway 402 is unable to handle DNS responses (authentic and/or spoofed), as determined by the network gateway 402, the man in the middle gateway, or another element of the network, the network gateway 402 can pass some or all of the DNS requests to a cloud DNS service 410. This cloud DNS service may then handle the received DNS requests, responding with authentic and/or spoofed responses.

Later, for example, when the network traffic is lower, the network 400 can suspend the use of the cloud DNS and/or cloud proxy service. Thus, highly variable network loads may be handled by the network 400.

A similar configuration of the network 400 may be used for other purposes. For example, the network use of cloud DNS, cloud proxy, and other cloud services may be used to provide redundant functionality in case of outages. For example, if service is planned for the man in the middle gateway, the cloud proxy may be configured to handle the man in the middle gateway's tasks while the planned outage occurs. Similarly, the cloud proxy may be configured to take over for the man in the middle gateway if the man in the middle gateway fails unexpectedly.

Figure 5:
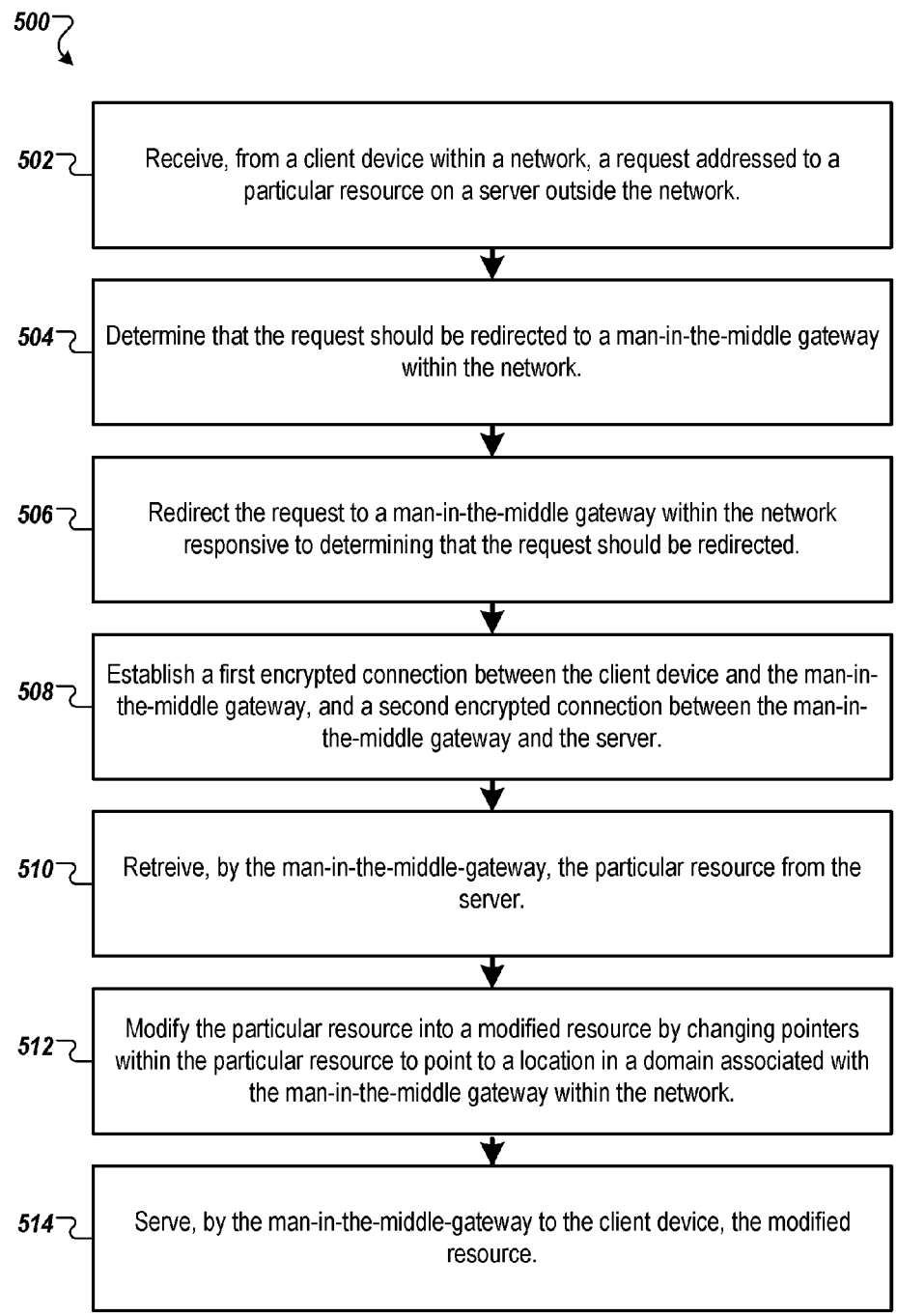
FIG. 5 is a flow chart of an example process for selectively performing man in the middle decryption.

FIG. 5 is a flow chart of an example process 500 for selectively performing man in the middle decryption.

The process 500 includes receiving 502, from a client device within a network, a request addressed to a particular resource on a server outside the network.

The process 500 includes determining 504 that the request should be redirected to a man-in-the-middle gateway within the network.

The process 500 includes redirecting 506 the request to a man-in-the-middle gateway within the network responsive to determining that the request should be redirected.

The process 500 includes establishing 508 a first encrypted connection between the client device and the man-in-the-middle gateway, and a second encrypted connection between the man-in-the-middle gateway and the server.

The process 500 includes retrieving 510, by the man-in-the-middle-gateway, the particular resource from the server.

The process 500 includes modifying 512 the particular resource into a modified resource by changing pointers within the particular resource to point to a location in a domain associated with the man-in-the-middle gateway within the network. In some examples, modifying the particular resource into the modified resource comprises modifying the resource based on a security policy. In some examples, modifying the particular resource comprises replacing the resource with a different resource. In some examples, modifying the particular resource comprises replacing Hypertext Transfer Protocol (HTTP) links in the particular resource with different HTTP links. In some examples, modifying the particular resource comprises replacing the resource with an HTTP status code object.

The process 500 includes serving 514, by the man-in-the-middle-gateway to the client device, the modified resource.

In some examples, the request is a first request and the client device is a first client device, and the process 500 can include receiving, from a second client device within the network, a second request addressed to the particular resource, determining that the second request should not be redirected to the man-in-the-middle gateway within the network, responsive to determining that the second request should not be redirected, redirecting the second request to a proxy service outside of the network configured to: establish a third encrypted connection between the second client device and the proxy service, and a fourth encrypted connection between the proxy service and the server; retrieve the first resource from the server; modify the first resource into a second modified resource by changing pointers within the first resource; and serve the second modified resource to the second client device. The process can further include receiving, from a third client device within the network, a third request addressed to an address of a second resource on a second server outside the network; and routing the request to the address of the second resource.

In some examples, the process 500 can include determining that a security policy of the network identifies the particular resource for inspection upon entry to the network.

Figure 6:
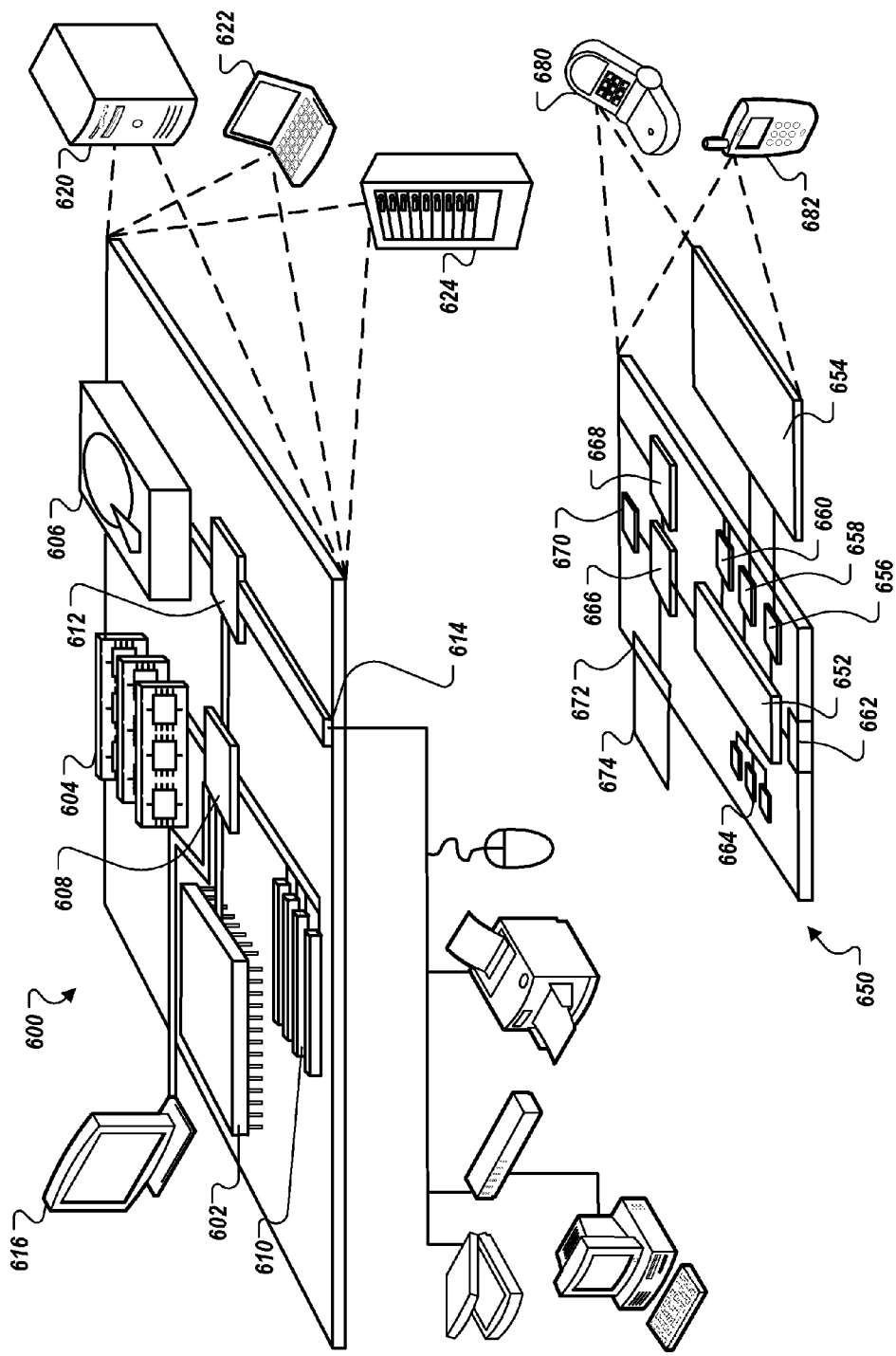
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer-implemented method executed by one or more processors, the method comprising:
   receiving, from a client device within a network, a request addressed to a particular resource on a server outside the network;
   determining that the request should be redirected to a man-in-the-middle gateway within the network;
   redirecting the request to a man-in-the-middle gateway within the network responsive to determining that the request should be redirected;
   establishing a first encrypted connection between the client device and the man-in-the-middle gateway, and a second encrypted connection between the man-in-the-middle gateway and the server;
   retrieving, by the man-in-the-middle-gateway, the particular resource from the server;
   modifying the particular resource into a modified resource by changing pointers within the particular resource to point to a location in a domain associated with the man-in-the-middle gateway within the network; and
   serving, by the man-in-the-middle-gateway to the client device, the modified resource.

2. The method of claim 1, wherein the request is a first request and the client device is a first client device, the method further comprising:
   receiving, from a second client device within the network, a second request addressed to the particular resource;
   determining that the second request should not be redirected to the man-in-the-middle gateway within the network;
   responsive to determining that the second request should not be redirected to the man-in-the-middle gateway, redirecting the second request to a proxy service outside of the network configured to:
      establish a third encrypted connection between the second client device and the proxy service, and a fourth encrypted connection between the proxy service and the server;
      retrieve the particular resource from the server;
      modify the particular resource into a second modified resource by changing pointers within the particular resource; and
      serve the second modified resource to the second client device.

3. The method of claim 2, the method further comprising:
   receiving, from a third client device within the network, a third request addressed to an address of a second resource on a second server outside the network; and
   routing the request to the address of the second resource.

4. The method of claim 1, wherein modifying the particular resource into the modified resource comprises modifying the particular resource based on a security policy.

5. The method of claim 1, wherein modifying the particular resource into the modified resource comprises replacing the resource with a different resource.

6. The method of claim 1, wherein modifying the particular resource into the modified resource comprises replacing Hypertext Transfer Protocol (HTTP) links in the particular resource with different HTTP links.

7. The method of claim 1, wherein modifying the particular resource into the modified resource comprises replacing the resource with an HTTP status code object.

8. The method of claim 1, the method further comprising determining that a security policy of the network identifies the particular resource for inspection upon entry to the network.

9. A system comprising:
a processor configured to execute computer program instructions; and
a tangible, non-transitory computer storage medium encoded with computer program instructions that, when executed by the processor, cause the system to perform operations comprising:
receiving, from a client device within a network, a request addressed to a particular resource on a server outside the network;
determining that the request should be redirected to a man-in-the-middle gateway within the network;
redirecting the request to a man-in-the-middle gateway within the network responsive to determining that the request should be redirected;
establishing a first encrypted connection between the client device and the man-in-the-middle gateway, and a second encrypted connection between the man-in-the-middle gateway and the server;
retrieving, by the man-in-the-middle-gateway, the particular resource from the server;
modifying the particular resource into a modified resource by changing pointers within the particular resource to point to a location in a domain associated with the man-in-the-middle gateway within the network; and
serving, by the man-in-the-middle-gateway to the client device, the modified resource.

10. The system of claim 9, wherein the request is a first request and the client device is a first client device, the operations further comprising:
receiving, from a second client device within the network, a second request addressed to the particular resource;
determining that the second request should not be redirected to the man-in-the-middle gateway within the network;
responsive to determining that the second request should not be redirected to the man-in-the-middle gateway, redirecting the second request to a proxy service outside of the network.

11. The system of claim 10, the operations further comprising:
receiving, from a third client device within the network, a third request addressed to an address of a second resource on a second server outside the network; and
routing the request to the address of the second resource.

12. The system of claim 9, wherein modifying the particular resource into the modified resource comprises modifying the particular resource based on a security policy.

13. The system of claim 9, wherein modifying the particular resource into the modified resource comprises replacing the resource with a different resource.

14. The system of claim 9, wherein modifying the particular resource into the modified resource comprises replacing Hypertext Transfer Protocol (HTTP) links in the particular resource with different HTTP links.

15. The system of claim 9, wherein modifying the particular resource into the modified resource comprises replacing the resource with an HTTP status code object.

16. The system of claim 9, the operations further comprising determining that a security policy of the network identifies the particular resource for inspection upon entry to the network.

17. A non-transitory computer-readable medium storing instructions operable when executed to cause at least one processor to perform operations comprising:
receiving, from a client device within a network, a request addressed to a particular resource on a server outside the network;
determining that the request should be redirected to a man-in-the-middle gateway within the network;
redirecting the request to a man-in-the-middle gateway within the network responsive to determining that the request should be redirected;
establishing a first encrypted connection between the client device and the man-in-the-middle gateway, and a second encrypted connection between the man-in-the-middle gateway and the server;
retrieving, by the man-in-the-middle-gateway, the particular resource from the server;
modifying the particular resource into a modified resource by changing pointers within the particular resource to point to a location in a domain associated with the man-in-the-middle gateway within the network; and
serving, by the man-in-the-middle-gateway to the client device, the modified resource.

18. The non-transitory computer-readable medium of claim 17, wherein the request is a first request and the client device is a first client device, the operations further comprising:
receiving, from a second client device within the network, a second request addressed to the particular resource;
determining that the second request should not be redirected to the man-in-the-middle gateway within the network;
responsive to determining that the second request should not be redirected to the man-in-the-middle gateway, redirecting the second request to a proxy service outside of the network configured to:
establish a third encrypted connection between the second client device and the proxy service, and a fourth encrypted connection between the proxy service and the server;
retrieve the particular resource from the server;
modify the particular resource into a second modified resource by changing pointers within the particular resource; and
serve the second modified resource to the second client device.

19. The non-transitory computer-readable medium of claim 18, the operations further comprising:
receiving, from a third client device within the network, a third request addressed to an address of a second resource on a second server outside the network; and
routing the request to the address of the second resource.

20. The non-transitory computer-readable medium of claim 17, wherein modifying the particular resource into the modified resource comprises modifying the particular resource based on a security policy.

21. The non-transitory computer-readable medium of claim 17, wherein modifying the particular resource into the modified resource comprises replacing the resource with a different resource.

22. The non-transitory computer-readable medium of claim 17, wherein modifying the particular resource into the modified resource comprises replacing Hypertext Transfer Protocol (HTTP) links in the particular resource with different HTTP links.

23. The non-transitory computer-readable medium of claim 17, wherein modifying the particular resource into the modified resource comprises replacing the resource with an HTTP status code object.

24. The non-transitory computer-readable medium of claim 17, the operations further comprising determining that a security policy of the network identifies the particular resource for inspection upon entry to the network.

* * * * *